Patented June 20, 1933

1,914,509

UNITED STATES PATENT OFFICE

ALPHONS O. JAEGER, OF MOUNT LEBANON, PENNSYLVANIA, ASSIGNOR TO THE SELDEN COMPANY, OF PITTSBURGH, PENNSYLVANIA, A CORPORATION OF DELAWARE

MOTOR FUEL

No Drawing.   Application filed July 24, 1931.   Serial No. 552,997.

This invention relates to motor fuels and more particularly to motor fuels containing unsaturated constituents, which tend to form gums such as the so-called cracked gasolines.

Cracked gasolines command a premium as motor fuels at the present time owing to their excellent anti-knock qualities. However, they are open to the disadvantage that they form gum and discolor, particularly, when exposed to sunlight. It has been proposed in the past to stabilize unsaturated motor fuels and inhibit or minimize gum formation by the addition of stabilizers, among which, only two have achieved any practical success, namely, anthracene and acid amides of aromatic amines such as acetanilide.

I have found that phthalide and its substitution and reduction products, such as hexahydrophthalide

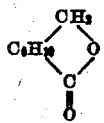

and various substituted phthalides, such as mono or dialkyl or aryl phthalides, hydroxyalkyl phthalides, alkylidene phthalides of the general formula

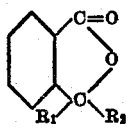

where $R_1$ and $R_2$ are hydrogen groups (phthalide) or alkyl or hydroxyalkyl or alkylidene and the like, are effective stabilizers.

The phthalide substances may be used alone as stabilizers or may be mixed with other stabilizers. In some cases it is desirable to inhibit formation of acid in the motor fuel and antacids may be added in small quantities. Organic bases, such as aromatic amines for instance aniline or toluidine form excellent antacids.

In general it is sufficient to add a fraction of 1% of the stabilizer, but larger amounts may be used. For reason of economy, it is, however, ordinarily desirable to use less than 1%. Not only does the phthalide substance act as an efficient stabilizer, but phthalide itself and many of its derivatives possess the peculiar property of being about to dissolve difficultly soluble vat dyes of the perylene series, such as for example, perylene tetra-carboxylic acid dimethyl imide and its chlorinated products and dyes of the violanthrone series. This makes it readily possible to incorporate vat dyes with gasoline and so to market the product with a dye which is not affected by sunlight and is an added advantage of the phthalide stabilizer.

The invention will be described in greater detail in the following specific examples which illustrate typical motor fuels falling under the present invention.

Example 1

2–5 pounds of phthalide are mixed with 100 barrels of cracked gasoline, producing a well stabilized motor fuel.

Example 2

4–10 pounds of a saturated solution of chlorinated or unchlorinated perylene tetracarboxylic acid dimethylimide in phthalide are added to 100 barrels of cracked gasoline which may contain an anti-detonant, such as tetraethyl lead or a metal carbonyl. A well stabilized red colored gasoline is obtained.

Example 3

2–5 pounds of phthalide or hexahydrophthalide and 3 pounds of aniline are added to 100 barrels of cracked gasoline, producing a thoroughly stabilized motor fuel, which shows no tendency to acid formation.

Example 4

2–6 pounds of mono or diethyl phthalide are added to 100 barrels of cracked gasoline, resulting in a satisfactory stabilized product.

Example 5

2–8 pounds of ethylidene phthalide are added to 100 barrels of cracked gasoline, producing a well stabilized product, which also possesses a faint pleasant odor reminiscent of celery for the alkylidene phthalides have a strong celery-like odor.

*Example 6*

2–6 pounds of ethanol phthalide are added to 100 barrels of cracked gasoline, producing a well stabilized product.

In the claims the expression "phthalide substance" will be used to cover phthalide and its reduction and substitution products.

What is claimed as new is:

1. A cracked motor fuel containing a phthalide substance in an amount sufficient to inhibit gum formation.

2. A motor fuel containing unsaturated gum forming constituents and a phthalide substance in an amount sufficient to inhibit gum formation.

3. A cracked motor fuel containing phthalide in an amount sufficient to inhibit gum formation.

4. A motor fuel containing unsaturated gum forming constituents and phthalide in an amount sufficient to inhibit gum formation.

5. A cracked motor fuel containing a hydrogenated phthalide.

6. A cracked motor fuel containing an alkyl phthalide in an amount sufficient to inhibit gum formation.

7. A cracked motor fuel containing a phthalide substance and an antacid in an amount sufficient to inhibit gum formation.

8. A cracked motor fuel containing a phthalide substance in an amount sufficient to inhibit gum formation and a perylene vat dye dissolved therein.

9. A cracked motor fuel containing phthalide in an amount sufficient to inhibit gum formation and a perylene vat dye dissolved therein.

10. A cracked motor fuel containing phthalide in an amount sufficient to inhibit gum formation and a perylene tetracarboxylic acid di-imide vat dyestuff.

11. A cracked motor fuel according to claim 1, in which the amount of a phthalide substance is less than 1%.

12. A motor fuel according to claim 2, in which the amount of a phthalide substance is less than 1%.

13. A motor fuel according to claim 3, in which the phthalide is present in an amount less than 1%.

14. A motor fuel according to claim 4, in which the phthalide is present in an amount less than 1%.

15. A cracked motor fuel containing a material selected from a group consisting of alkyl phthalide and alkylidene phthalide, the phthalides being in amounts sufficient to inhibit gum formation.

16. A cracked motor fuel containing a phthalide substance in the proportion of not materially less than two pounds of the substance per one hundred barrels of cracked gasoline and not materially exceeding 1% of the substance to the motor fuel.

17. A cracked motor fuel containing a substance selected from a group consisting of phthalide, hexahydrophthalide, diethyl phthalide, ethylidene phthalide and ethanol phthalide, the ratio of the phthalide substance being not materially less than two pounds per one hundred barrels of motor fuel and not substantially exceeding 1% of the motor fuel.

Signed at Pittsburgh, Pennsylvania, this 23rd day of July, 1931.

ALPHONS O. JAEGER.

DISCLAIMER 1,914,509.—*Alphons O. Jaeger*, Mount Lebanon, Pa. MOTOR FUEL. Patent dated June 20, 1933. Disclaimer filed July 25, 1935, by the assignee, *American Cyanamid & Chemical Corporation*.

Hereby enters this disclaimer to claims 1, 2, 11, and 12 of said patent reading as follows:

"1. A cracked motor fuel containing a phthalide substance in an amount sufficient to inhibit gum formation.

"2. A motor fuel containing unsaturated gum-forming constituents and a phthalide substance in an amount sufficient to inhibit gum formation."

"11. A cracked motor fuel containing phthalide in an amount sufficient to inhibit gum formation and a perylene tetracarboxylic acid di-imide vat dyestuff.

"12. A cracked motor fuel according to claim 1, in which the amount of a phthalide substance is less than 1%."

[*Official Gazette August 20, 1935.*]